US012595390B2

(12) United States Patent　(10) Patent No.: US 12,595,390 B2
Furuya et al.　(45) Date of Patent: Apr. 7, 2026

(54) STEEL SHEET AND PRODUCTION METHOD THEREFOR

(71) Applicant: JFE Steel Corporation, Tokyo (JP)

(72) Inventors: Shinichi Furuya, Tokyo (JP); Takeshi Matsuda, Tokyo (JP); Tomohiro Aoyama, Tokyo (JP); Shun Koibuchi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 18/698,095

(22) PCT Filed: Jun. 17, 2022

(86) PCT No.: PCT/JP2022/024357
§ 371 (c)(1),
(2) Date: Apr. 3, 2024

(87) PCT Pub. No.: WO2023/062875
PCT Pub. Date: Apr. 20, 2023

(65) Prior Publication Data
US 2024/0400851 A1　Dec. 5, 2024

(30) Foreign Application Priority Data

Oct. 14, 2021　(JP) ................................. 2021-168760
Mar. 22, 2022　(JP) ................................. 2022-045024

(51) Int. Cl.
C09D 125/14　(2006.01)
B05D 7/14　(2006.01)
(Continued)

(52) U.S. Cl.
CPC ............. C09D 125/14 (2013.01); B05D 7/14 (2013.01); C09D 5/08 (2013.01); C09D 191/06 (2013.01);
(Continued)

(58) Field of Classification Search
CPC ............................ C09D 125/14; C09D 191/06
(Continued)

(56) References Cited

U.S. PATENT DOCUMENTS 6,797,770 B1　9/2004　Mori et al.
2004/0249036 A1 *　12/2004　Higai ....................... C09D 7/61
524/394
(Continued)

FOREIGN PATENT DOCUMENTS

EP　　1 491 603 A1　12/2004
JP　　H05-077357 A　3/1993
(Continued)

OTHER PUBLICATIONS

Hiroyuki et al., JP 4675553 B2 Google Patents translation printed on Oct. 2, 2025, Apr. 27, 2011, entire translation (Year: 2011).*
(Continued)

*Primary Examiner* — Katherine A Christy
(74) *Attorney, Agent, or Firm* — Buchanan Ingersoll & Rooney PC

(57) ABSTRACT

A lubricating film-coated steel sheet has at least one surface on which an organic resin film is formed. The organic resin film contains an acrylic resin having a glass transition point (Tg) of 100° C. or higher and an acid value ratio R=acid value (mg-KOH/g)/Tg (° C.) of 1.50 or more, and 5 mass % or more of a polyolefin wax having a melting point of 100° C. or higher and 145° C. or lower and an average particle diameter of 3.0 μm or less, and is formed on a surface of a steel sheet at a coating weight, W, of 0.3 g/m² or more and 2.5 g/m² or less per surface.

11 Claims, 1 Drawing Sheet

(51) Int. Cl.
  C09D 5/08 (2006.01)
  C09D 191/06 (2006.01)
(52) U.S. Cl.
  CPC ...... *B05D 2202/10* (2013.01); *B05D 2252/00* (2013.01); *B05D 2502/00* (2013.01); *B05D 2507/01* (2013.01); *B05D 2701/00* (2013.01)
(58) Field of Classification Search
  USPC ........................................................ 428/626
  See application file for complete search history.

(56) References Cited

U.S. PATENT DOCUMENTS

| | | | |
|---|---|---|---|
| 2018/0223124 A1 | 8/2018 | Yan et al. | |
| 2018/0345317 A1* | 12/2018 | Hirasawa | ................. C09D 5/00 |

FOREIGN PATENT DOCUMENTS

| | | |
|---|---|---|
| JP | H07-011089 A | 1/1995 |
| JP | H09-099517 A | 4/1997 |
| JP | H09170059 A | 6/1997 |
| JP | H09296132 A | 11/1997 |
| JP | H1052881 A | 2/1998 |
| JP | 2000167981 A | 6/2000 |
| JP | 2000309747 A | 11/2000 |
| JP | 4675553 B2 * | 4/2011 |
| JP | 2017105986 A | 6/2017 |
| JP | 2018530635 A | 10/2018 |

OTHER PUBLICATIONS

International Search Report (PCT/ISA/210) with translation mailed Jul. 19, 2022, by the Japan Patent Office as the International Searching Authority for International Application No. PCT/JP2022/024357. (4 pages).

Extended European Search Report issued Oct. 21, 2024, by the European Patent Office in corresponding European Patent Application No. 22880581.8-1102. (7 pages).

Office Action (Request for the Submission of an Opinion) issued Oct. 31, 2025, by the Korean Intellectual Property Office in corresponding Korean Patent Application No. 10-2024-7011093 and an English translation with the Concise Statement of Relevance of the Office Action. (16 pages).

* cited by examiner

STEEL SHEET AND PRODUCTION METHOD THEREFOR

CROSS REFERENCE TO RELATED APPLICATIONS

This is the U.S. National Phase application of PCT/JP2022/024357, filed Jun. 17, 2022, which claims priority to Japanese Patent Application No. 2021-168760 filed Oct. 14, 2021 and Japanese Patent Application No. 2022-045024, filed Mar. 22, 2022, the disclosures of these applications being incorporated herein by reference in their entireties for all purposes.

FIELD OF THE INVENTION

The present invention relates to a steel sheet having excellent slidability in press forming, and a production method therefor. Particularly, it relates to a steel sheet that includes a lubricating film and that has excellent formability in severe drawing, and a production method therefor.

BACKGROUND OF THE INVENTION

Cold-rolled steel sheets and hot-rolled steel sheets are widely used in a broad range of fields centering on automobile body usages, and in these usages, the steel sheets are typically press-formed and used. In recent years, there has been increasing need for parts integration for streamlining the process and improvements in design, and more complicated forming has become necessary.

More complicated press forming may seriously adversely affect the automobile productivity since steel sheets may not withstand forming and may rupture and die galling may occur during continuous press forming.

One way to improve the press formability of cold-rolled steel sheets and hot-rolled steel sheets is to surface-treat the die. Surface-treating the die is a widely implemented method, but according to this method, the die cannot be adjusted after the surface treatment. Another issue is the high cost. Thus, improving the press formability of steel sheets themselves has been highly demanded.

One way to improve the press formability without surface-treating the die is to use a lubricant oil with high viscosity. However, this may cause degreasing failure after press forming, and the coatability may be degraded.

Thus, various types of lubricating surface treatment have been studied as the technology that enables press forming without surface-treating the die or using a lubricant oil with high viscosity.

Patent Literature 1 discloses a technology of forming a lubricating film, which is an acrylic resin film containing a synthetic resin powder, on a galvanized steel sheet.

Patent Literature 2 discloses a metal sheet coated with a lubricating film in which a solid lubricant projects by 0.01 to 1.5 μm from the resin film surface.

Patent Literature 3 discloses a lubricating surface-treated metal product that has excellent press formability and is coated with a 0.5 to 5 μm film containing a polyurethane resin and a lubricant.

Patent Literature 4 discloses a technology of forming an alkali-soluble organic film containing an epoxy resin and a lubricant on a steel sheet.

PATENT LITERATURE

PTL 1: Japanese Unexamined Patent Application Publication No. 9-170059
PTL 2: Japanese Unexamined Patent Application Publication No. 10-52881

PTL 3: Japanese Unexamined Patent Application Publication No. 2000-309747
PTL 4: Japanese Unexamined Patent Application Publication No. 2000-167981

SUMMARY OF THE INVENTION

However, according to Patent Literatures 1 to 4, although the lubricating property emerges due to a lubricating effect of the lubricant or the like contained therein, the press formability has not been always sufficient in complicated forming.

Aspects of the present invention have been made under the aforementioned circumstances, and an object thereof is to provide a steel sheet to be subjected to complicated forming for which press forming is difficult, the steel sheet exhibiting low sliding resistance in a portion prone to cracking during press forming and exhibiting excellent press formability in a portion subjected to a high contact pressure where occurrence of die galling is anticipated, and to provide a production method therefor.

In addition, the antirust property is also necessary when the steel sheets are stored in a coil form. Furthermore, when steel sheets are to be used in automobile bodies, the steel sheets need to have film removability sufficient in an alkaline degreasing step in the coating step and excellent adhesion and weldability in the assembly step.

The inventors of the present invention have carried out extensive research to address the issues described above. As a result, the inventors have found that the aforementioned issues can be addressed by forming, on a steel sheet surface, an organic resin film at a coating weight W of 0.3 g/m² or more and 2.5 g/m² or less per surface, the organic resin film containing an acrylic resin having a glass transition point (Tg) of 100° C. or higher and an acid value ratio R=acid value (mg-KOH/g)/Tg (° C.) of 1.50 or more, and 5 mass % or more of a polyolefin wax having a melting point of 100° C. or higher and 145° C. or lower and an average particle diameter of 3.0 μm or less.

Aspects of the present invention have been completed on the basis of the aforementioned findings, and are as follows.

[1] A steel sheet having at least one surface on which a film containing an acrylic resin and a wax is formed, wherein the acrylic resin has a glass transition point (Tg) of 100° C. or higher and an acid value-to-glass transition point ratio R=acid value (mg-KOH/g)/Tg (° C.) of 1.50 or more, the wax is a polyolefin wax that has a melting point of 100° C. or higher and 145° C. or lower and an average particle diameter of 3.0 μm or less, a proportion of the wax in the film is 5 mass % or more, and a coating weight W of the film per surface is 0.3 g/m² or more and 2.5 g/m² or less.

[2] The steel sheet described in [1], in which the acid value of the acrylic resin is 180 mg-KOH/g or more and 350 mg-KOH/g or less.

[3] The steel sheet described in [1] or [2], in which the acid value-to-glass transition point ratio R is 2.05 or less.

[4] The steel sheet described in any one of [1] to [3], in which the film contains 30 mass % or more of the acrylic resin, and the proportion of the wax is 50 mass % or less.

[5] The steel sheet described in any one of [1] to [4], in which the acrylic resin has a mass-average molecular weight of 5000 or more and 30000 or less.

[6] The steel sheet described in any one of [1] to [5], in which the acrylic resin is a styrene acrylic resin.

[7] The steel sheet described in any one of [1] to [6], in which the steel sheet before formation of the film has an arithmetic mean roughness Ra of 0.4 μm or more and 2.5 μm or less.

[8] The steel sheet described in any one of [1] to [7], in which the film contains 5 mass % or more and 30 mass % or less of an antirust agent.

[9] The steel sheet described in any one of [1] to [8], in which the antirust agent is at least one selected from the group consisting of aluminum salts and zinc salts of phosphoric acids, and zinc oxide.

[10] The steel sheet described in any one of [1] to [9], in which the wax has an average particle diameter of 0.01 μm or more and 0.5 μm or less.

[11] The steel sheet described in any one of [1] to [10], in which the film contains 1 mass % or more and 10 mass % or less of silica.

[12] A method for producing the steel sheet described in any one of [1] to [11], the method including applying, to at least one surface of a steel sheet, a coating solution that contains the acrylic resin and the wax described in any one of [1] to [11], and drying the applied coating solution.

[13] The method for producing the steel sheet described in [12], in which a highest temperature that the steel sheet reaches during the drying is 60° C. or higher but not higher than the melting point of the wax.

[14] The method for producing the steel sheet described in [12] or [13], in which a proportion of all solid components in the coating solution is 1 mass % or more and 30 mass % or less. In accordance with aspects of the present invention, a steel sheet is a cold-rolled steel sheet or a hot-rolled steel sheet.

According to aspects of the present invention, the friction coefficient with the die or the like decreases prominently, and a steel sheet having excellent press formability is obtained. Thus, excellent press formability can be stably imparted to a steel sheet subjected to complicated forming.

A steel sheet having a film thereof has an excellent antirust property. Furthermore, since adhesion is also excellent, an adhesive can be used in the same manner as that for typical steel sheets; furthermore, since the film removability in alkaline degreasing is excellent, the coating step is not obstructed.

DETAILED DESCRIPTION OF EMBODIMENTS OF THE INVENTION

Figure 1:
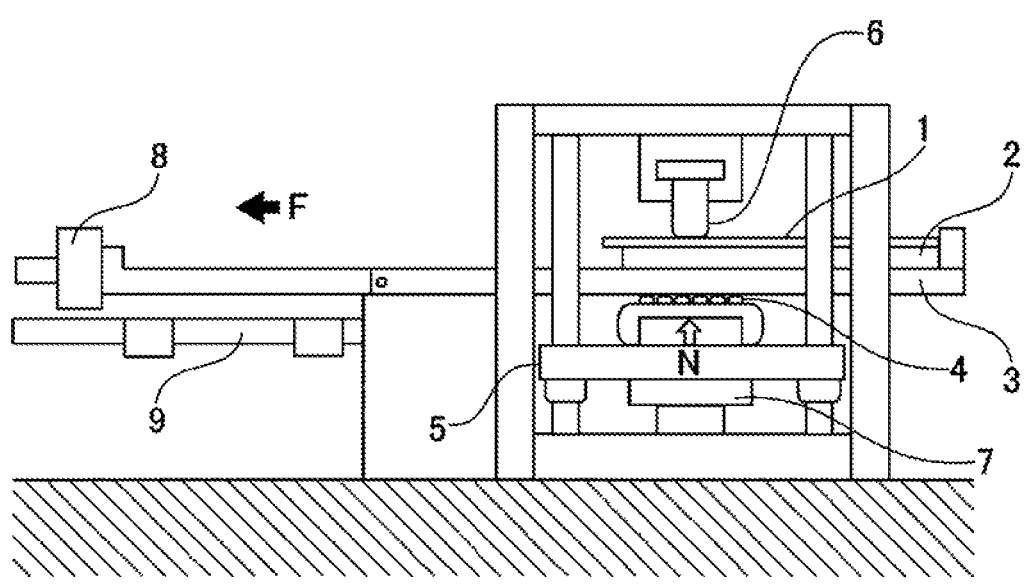
FIG. 1 is a schematic front view of a friction coefficient meter.

Embodiments of the present invention will now be described.

A steel sheet according to aspects of the present invention is a steel sheet having at least one surface on which a film containing an acrylic resin and a wax is formed. The acrylic resin has a glass transition point (Tg) of 100° C. or higher and an acid value-to-glass transition point ratio R=acid value (mg-KOH/g)/Tg (° C.) of 1.50 or more. The wax is a polyolefin wax that has a melting point of 100° C. or higher and 145° C. or lower and an average particle diameter of 3.0 μm or less. A proportion of the wax in the film is 5 mass % or more, and a coating weight W of the organic resin film per surface is 0.3 g/m² or more and 2.5 g/m² or less.

Hereinafter, the acid value-to-glass transition point ratio R=acid value (mg-KOH/g)/Tg (° C.) is represented as R=acid value/Tg.

The glass transition point of the acrylic resin in the film according to aspects of the present invention is set to 100° C. or higher to obtain an excellent lubricating property. At a glass transition point lower than 100° C., the resin softens during sliding, the wax holding ability is decreased, the ability to prevent direct contact between a metal sheet and a die is degraded, and thus excellent slidability is not obtained. The glass transition point is preferably 110° C. or higher and 150° C. or lower. At a glass transition point exceeding 150° C., the resin tends to become brittle due to high hardness during sliding, and an excellent lubricating property is not always obtained.

Here, the glass transition point refers to a midpoint glass transition temperature measured in accordance with JIS K 7121 "Testing Methods for Transition Temperatures of Plastics".

The acid value-to-glass transition point ratio R=acid value/Tg of the acrylic resin is set to 1.50 or more. Even when the glass transition point is 100° C. or higher, an excellent lubricating property is not obtained if the acid value is low (R<1.50). The reason for this is not exactly clear but is presumably that the carboxy groups in the acrylic resin have high affinity with the die and produce an effect of adsorbing the polyolefin wax in the film to the die during sliding. As the acrylic resin component containing the polyolefin wax adsorbs to the die during sliding, the surface of the die becomes protected by the polyolefin wax, the effect of preventing direct contact with the steel sheet is enhanced, and thus the slidability is improved. Accordingly, when the acid value is low (R<1.50), there are not enough carboxy groups, and thus the slidability is poor. When the glass transition point of the acrylic resin is increased, the resin does not soften as easily by sliding and thus does not easily adsorb to the die. Consequently, in order to obtain excellent slidability even at an increased glass transition point, the acid value also needs to be increased. In other words, the acid value-to-glass transition point ratio R=acid value/Tg needs to be 1.50 or more. R is preferably 1.80 or more. The upper limit of R is not particularly limited but is preferably 2.05 or less. The reason for this is because the antirust property may be degraded at R exceeding 2.05.

The acid value of the acrylic resin is preferably 180 mg-KOH/g or more and 350 mg-KOH/g or less. At an acid value less than 180 mg-KOH/g, the film removability by alkali may be degraded, and the adhesive strength by an adhesive may not be sufficiently obtained. At an acid value exceeding 350 mg-KOH/g, the antirust property may be degraded.

Here, an acid value is the weight in milligrams of potassium hydroxide necessary to neutralize carboxy groups contained in 1 g of a resin, and is measured in accordance with JIS K 0070, "Test methods for acid value, saponification value, ester value, iodine value, hydroxyl value and unsaponifiable matter of chemical products". In accordance with aspects of the present invention, the unit is indicated as mg-KOH/g.

The wax used in accordance with aspects of the present invention may be a polyolefin wax having a melting point of 100° C. or higher and 145° C. or lower and an average particle diameter of 3.0 μm or less.

A polyolefin wax is used as the wax because the polyolefin wax has low surface energy and a self-lubricating property, and thus an excellent lubricating property can be obtained. Moreover, it is relatively easy to adjust the melting point of a polyolefin to 100° C. or higher and 145° C. or lower by controlling density and molecular weight.

When the melting point of the polyolefin wax is 100° C. or higher and 145° C. or lower, not only the self-lubricating property of the polyolefin wax itself is exhibited, but also the polyolefin wax becomes in a half-molten state due to sliding during press forming and mixes with an organic resin, and thus the surface of the die can be covered with the resulting lubricating film component. As a result, an excellent lubricating effect is obtained by reducing the direct contact between the die and the steel sheet. When the melting point of the polyolefin wax is lower than 100° C., the polyolefin wax completely melts due to the frictional heat generated by sliding during press forming, and the lubricating effect of the polyolefin wax itself cannot be sufficiently obtained; furthermore, the aforementioned die-coating effect is no longer obtained. When the melting point of the polyolefin wax is higher than 145° C., the polyolefin wax does not melt during sliding, a sufficient lubricating effect is not obtained, and the die-coating effect is no longer obtained. Furthermore, the melting point of the polyolefin wax is preferably 120° C. or higher and 140° C. or lower.

Here, the melting point of the polyolefin wax is the melting temperature measured in accordance with JIS K 7121 "Testing Methods for Transition Temperatures of Plastics".

When the average particle diameter of the polyolefin wax exceeds 3.0 μm, the polyolefin wax does not easily mix with the organic resin during sliding, the aforementioned die-coating effect is not obtained, and a sufficient lubricating property is not obtained. The average particle diameter of the polyolefin wax is preferably 0.5 μm or less and more preferably 0.3 μm or less.

The average particle diameter of the polyolefin wax is preferably 0.01 μm or more. When the average particle diameter of the polyolefin wax is less than 0.01 μm, the polyolefin wax easily dissolves in a lubricant oil during sliding, and a sufficient improvement effect of lubricating property may not be exhibited; furthermore, aggregation is likely to occur in a coating solution for forming the film, and thus the coating solution stability is low. The average particle diameter of the polyolefin wax is more preferably 0.03 μm or more. Considering the property to mix with the aforementioned acrylic resin, the average particle diameter of the polyolefin wax is preferably 0.01 μm or more and 0.5 μm or less.

The average particle diameter is a median diameter of the volume-average diameters, and is determined by a laser diffraction/scattering method. For example, the average particle diameter can be determined by analyzing a sample diluted with pure water with a laser diffraction/scattering particle size distribution analyzer, Partica (registered trademark) LA-960V2 (produced by HORIBA, Ltd.).

A polyethylene wax is preferably used since the polyethylene wax yields the highest lubricating effect among the polyolefin waxes.

The mass fraction of the polyolefin wax in the film is 5 mass % or more. When the mass fraction of the polyolefin wax in the film is less than 5 mass %, a sufficient lubricating effect is not obtained. When the mass fraction of the polyolefin wax in the film is 10 mass % or more, a particularly excellent lubricating effect is obtained. The mass fraction of the polyolefin wax in the film is preferably 50 mass % or less. When the mass fraction of the polyolefin wax in the film exceeds 50 mass %, the polyolefin wax tends to fall off due to deficiency of the base resin component, the adhesion to the steel sheet is degraded, and the film cannot stably exist and may exhibit degraded adhesion. Furthermore, when the steel sheet is used in an automobile body, a sufficient degreasing property may not be obtained in the alkaline degreasing step in the coating step, and the film may not sufficiently be removed in the alkali degreasing step and may remain and degrade the coatability. The mass fraction of the polyolefin wax in the film is more preferably 30 mass % or less.

Here, the mass fraction of the polyolefin wax in the film is the ratio of the mass of the solid component in the polyolefin wax to the mass of all solid components in the coating solution.

The film according to aspects of the present invention preferably contains 30 mass % or more of the acrylic resin. When the mass fraction of the acrylic resin in the film is 30 mass % or more, the properties that are affected by physical properties derived from the acrylic resin, such as the lubricating property-improving effect caused by the adsorption to the die during sliding, film removability, and adhesion, are sufficiently obtained. When the mass fraction of the acrylic resin in the film is less than 30 mass %, the influence of other components is increased, and the desired performance may not be obtained.

The mass-average molecular weight of the acrylic resin is preferably 5000 or more and 30000 or less. When the mass-average molecular weight of the acrylic resin is less than 5000, the antirust property may be degraded, and when more than 30000, the adhesion may be degraded.

Here, the mass-average molecular weight is a mass-average molecular weight measured on the basis of JIS K 7252 "Plastics—Determination of average molecular mass and molecular mass distribution of polymers using size-exclusion chromatography".

Furthermore, the acrylic resin is preferably a styrene acrylic resin. Since styrene is included in the resin monomers, water resistance is improved, and thus the antirust property is improved. Furthermore, an effect of achieving excellent slidability compared to when no styrene is contained is also exhibited.

The film according to aspects of the present invention preferably contains 5 mass % or more and 30 mass % or less of an antirust agent in the film. Rusting does not occur in a normal storage environment even when no antirust agent is contained; however, when the antirust agent content is less than 5 mass %, rust may occur in a poor storage environment. In particular, when a steel strip in a coiled and lapped state is stored, the steel strip may absorb moisture and rust. When the proportion of the antirust agent is more than 30 mass %, adhesion may be degraded, the antirust agent may settle in a coating solution, and the coating solution stability may be degraded. The antirust agent is preferably at least one selected from the group consisting of aluminum salts and zinc salts of phosphoric acids, and zinc oxide. Here, the phosphoric acids include orthophosphoric acid and condensed phosphoric acids such as pyrophosphoric acid, tripolyphosphoric acid, tetrapolyphosphoric acid, and metaphosphoric acid. A sufficient antirust effect can be exhibited by using these antirust agents, and, in addition, the degradation of the coating solution stability is decreased.

The film according to aspects of the present invention preferably contains 1 mass % or more and 10 mass % or less of silica in the film. The water repellency of the film increases by containing silica, and the antirust property is improved. Moreover, it becomes possible to reduce settling of the antirust agent by containing silica, and thus the coating solution stability is improved. This effect is not easily obtained if the silica content is less than 1 mass %, and the adhesion may be degraded at a content exceeding 10 mass %. When silica is to be contained in the film according to aspects of the present invention, colloidal silica having a particle diameter of 5 nm or more and 200 nm or less is preferably used.

In accordance with aspects of the present invention, a surface conditioner, a defoaming agent, a dispersing agent, etc., typically added to coating solutions may be contained as the components other than the acrylic resin, the wax, the antirust agent, and silica.

The surface roughness of the steel sheet used in accordance with aspects of the present invention before formation of the film is preferably 0.4 μm or more and 2.5 μm or less in terms of arithmetic mean roughness Ra. When Ra is 2.5 μm or less, the lubricating effect of the film is stably obtained. When Ra is smaller than 0.4 μm, minute scratches that can occur during press forming may become conspicuous, and die galling may occur during press forming. When Ra exceeds 2.5 μm, the irregularities on the steel sheet become prominent, the film in the recessed portions does not effectively function during sliding, and the lubricating effect of the film may be diminished. The arithmetic mean roughness, Ra (μm), of the steel sheet can be measured in accordance with JIS B 0633:2001 (ISO 4288:1996). For example, when Ra is more than 0.1 and 2 or less, a roughness curve measured by setting the cutoff value and sampling length to 0.8 mm and the evaluation length to 4 mm is used to determine the Ra. When Ra is more than 2 and 10 or less, a roughness curve measured by setting the cutoff value and sampling length to 2.5 mm and the evaluation length to 12.5 mm is used to determine the Ra.

A method for producing a steel sheet according to aspects of the present invention will now be described.

A method for producing a steel sheet according to aspects of the present invention is a method for producing a steel sheet having at least one surface on which a film containing an acrylic resin and a wax is formed, in which the acrylic resin has a glass transition point (Tg) of 100° C. or higher and an acid value-to-glass transition point ratio R=acid value/Tg of 1.50 or more, and the organic resin film contains the acrylic resin and 5 mass % or more of a polyolefin wax having a melting point of 100° C. or higher and 145° C. or lower and an average particle diameter of 3.0 μm or less. A coating solution prepared by adding a wax to an acrylic resin solution or emulsion in which an acrylic resin is dissolved or dispersed in a medium is applied to the steel sheet surface and dried. Although water or an organic solvent can be used as the solvent of the coating solution, water is preferably used. The concentration of all solid components in the coating solution is preferably 1 mass % or more and 30 mass % or less. When the concentration of all solid components in the coating solution is less than 1 mass % or more than 30 mass %, coating unevenness may occur. The coating method is not particularly limited, and examples thereof include methods using roll coaters and bar coaters, and coating methods that involve spraying, immersing, and brushing. The steel sheet after the coating can be dried by a common method. Examples thereof include drying by hot air, drying by an IH heater, and infrared heating. The highest temperature that the steel sheet reaches during drying is preferably 60° C. or higher but not higher than the melting point of the wax used. When the highest temperature that the steel sheet reaches is lower than 60° C., drying takes longer, and the antirust property may be degraded. When the highest temperature that the steel sheet reaches is higher than the melting point of the wax, the wax melts and unites, the particle diameter increases, and thus the lubricating property may be degraded. Coating is preferably performed so that the film coating weight per surface of the steel sheet on a dry mass basis is 0.3 to 2.5 g/m². When the coating weight is less than 0.3 g/m², sufficient slidability may not be obtained, and when the coating weight is more than 2.5 g/m², the weldability and film removability by alkali and the adhesion may be degraded.

EXAMPLES

Aspects of the present invention will now be described through examples. The present invention is not limited to the examples described below.

Cold-rolled steel sheets (steel sheets Nos. A to C) having a sheet thickness of 0.8 mm and a hot-rolled steel sheet (steel sheet No. D) having a thickness of 2.0 mm all having arithmetic mean roughness Ra indicated in Table 1 were used. Coating solutions having compositions indicated in Table 2 were applied with a bar coater, and were dried so that the highest temperature the steel sheet reached was 80° C. by using an IH heater to form lubricated steel sheets. Here, the steel sheets A to D were SPCD (JIS G 3141) and SPHD (JIS G 3131) having 270 MPa-class tensile strength. Colloidal silica having a volume-average particle diameter of 9 nm was used as the silica.

The film coating weight was determined by removing the film from the steel sheet after the film coating, and dividing the difference in mass of the steel sheet before and after the film removal by the area.

TABLE 1

| Steel sheet No | Ra (μm) |
|---|---|
| A | 0.48 |
| B | 0.78 |
| C | 1.48 |
| D | 2.35 |

TABLE 2

| No. | Acrylic resin | | | | | Wax | | | | Antirust agent | Silica | |
| | Type | Tg (° C.) | Acid value (mg- KOH/g) | R (=acid value/Tg) | Molec- ular weight | Mass frac- tion (%) | Type | Melting point (° C.) | Average particle diameter (μm) | Mass frac- tion (%) | Type | Mass frac- tion (%) | Mass frac- tion (%) | Remarks |
|---|---|---|---|---|---|---|---|---|---|---|---|---|---|---|
| 1 | Styrene acrylic | 80 | 185 | 2.31 | 10000 | 80 | Polyeth- ylene | 130 | 0.15 | 20 | — | 0 | 0 | Compar- ative Example |
| 2 | Styrene acrylic | 100 | 200 | 2.00 | 10000 | 80 | Polyeth- ylene | 130 | 0.15 | 20 | — | 0 | 0 | Example |

TABLE 2-continued

| | Acrylic resin | | | | | | Wax | | | | Antirust agent | | Silica | |
|---|---|---|---|---|---|---|---|---|---|---|---|---|---|---|
| No. | Type | Tg (° C.) | Acid value (mg-KOH/g) | R (=acid value/Tg) | Molec-ular weight | Mass frac-tion (%) | Type | Melting point (° C.) | Average particle diameter (μm) | Mass frac-tion (%) | Type | Mass frac-tion (%) | Mass frac-tion (%) | Remarks |
| 3 | Styrene acrylic | 120 | 240 | 2.00 | 10000 | 80 | Polyeth-ylene | 130 | 0.15 | 20 | — | 0 | 0 | Example |
| 4 | Styrene acrylic | 130 | 350 | 2.69 | 10000 | 80 | Polyeth-ylene | 130 | 0.15 | 20 | — | 0 | 0 | Example |
| 5 | Styrene acrylic | 130 | 400 | 3.08 | 10000 | 80 | Polyeth-ylene | 130 | 0.15 | 20 | — | 0 | 0 | Example |
| 6 | Styrene acrylic | 101 | 160 | 1.58 | 10000 | 80 | Polyeth-ylene | 130 | 0.15 | 20 | — | 0 | 0 | Example |
| 7 | Styrene acrylic | 120 | 180 | 1.50 | 10000 | 80 | Polyeth-ylene | 130 | 0.15 | 20 | — | 0 | 0 | Example |
| 8 | Styrene acrylic | 130 | 220 | 1.69 | 4000 | 80 | Polyeth-ylene | 130 | 0.15 | 20 | — | 0 | 0 | Example |
| 9 | Styrene acrylic | 128 | 260 | 2.03 | 5000 | 80 | Polyeth-ylene | 130 | 0.15 | 20 | — | 0 | 0 | Example |
| 10 | Styrene acrylic | 110 | 200 | 1.82 | 30000 | 80 | Polyeth-ylene | 130 | 0.15 | 20 | — | 0 | 0 | Example |
| 11 | Styrene acrylic | 110 | 200 | 1.82 | 50000 | 80 | Polyeth-ylene | 130 | 0.15 | 20 | — | 0 | 0 | Example |
| 12 | Styrene acrylic | 140 | 180 | 1.29 | 10000 | 80 | Polyeth-ylene | 130 | 0.15 | 20 | — | 0 | 0 | Compar-ative Example |
| 13 | Styrene acrylic | 110 | 115 | 1.05 | 10000 | 80 | Polyeth-ylene | 130 | 0.15 | 20 | — | 0 | 0 | Compar-ative Example |
| 14 | Styrene acrylic | 120 | 240 | 2.00 | 10000 | 80 | Polyeth-ylene | 90 | 0.2 | 20 | — | 0 | 0 | Compar-ative Example |
| 15 | Styrene acrylic | 120 | 240 | 2.00 | 10000 | 80 | Polyeth-ylene | 100 | 0.3 | 20 | — | 0 | 0 | Example |
| 16 | Styrene acrylic | 120 | 240 | 2.00 | 10000 | 80 | Polyeth-ylene | 120 | 0.06 | 20 | — | 0 | 0 | Example |
| 17 | Styrene acrylic | 120 | 240 | 2.00 | 10000 | 80 | Polypro-pylene | 145 | 0.03 | 20 | — | 0 | 0 | Example |
| 18 | Styrene acrylic | 120 | 240 | 2.00 | 10000 | 80 | Polypro-pylene | 155 | 0.06 | 20 | — | 0 | 0 | Compar-ative Example |
| 19 | Styrene acrylic | 120 | 240 | 2.00 | 10000 | 80 | Polyeth-ylene | 132 | 0.5 | 20 | — | 0 | 0 | Example |
| 20 | Styrene acrylic | 120 | 240 | 2.00 | 10000 | 80 | Polyeth-ylene | 132 | 3 | 20 | — | 0 | 0 | Example |
| 21 | Styrene acrylic | 120 | 240 | 2.00 | 10000 | 80 | Polyeth-ylene | 132 | 6 | 20 | — | 0 | 0 | Compar-ative Example |
| 22 | Styrene acrylic | 120 | 240 | 2.00 | 10000 | 100 | — | — | — | 0 | — | 0 | 0 | Compar-ative Example |
| 23 | Styrene acrylic | 120 | 240 | 2.00 | 10000 | 95 | Polyeth-ylene | 120 | 0.06 | 5 | — | 0 | 0 | Example |
| 24 | Styrene acrylic | 120 | 240 | 2.00 | 10000 | 90 | Polyeth-ylene | 120 | 0.06 | 10 | — | 0 | 0 | Example |
| 25 | Styrene acrylic | 120 | 240 | 2.00 | 10000 | 50 | Polyeth-ylene | 120 | 0.06 | 50 | — | 0 | 0 | Example |
| 26 | Styrene acrylic | 120 | 240 | 2.00 | 10000 | 40 | Polyeth-ylene | 120 | 0.06 | 60 | — | 0 | 0 | Example |
| 27 | Acrylic | 110 | 190 | 1.73 | 10000 | 80 | Polyeth-ylene | 130 | 0.15 | 20 | — | 0 | 0 | Example |
| 28 | Styrene acrylic | 120 | 240 | 2.00 | 10000 | 75 | Polyeth-ylene | 130 | 0.15 | 20 | Aluminum tripoly-phosphate | 5 | 0 | Example |
| 29 | Styrene acrylic | 120 | 240 | 2.00 | 10000 | 65 | Polyeth-ylene | 130 | 0.15 | 20 | Aluminum tripoly-phosphate | 15 | 0 | Example |
| 30 | Styrene acrylic | 120 | 240 | 2.00 | 10000 | 50 | Polyeth-ylene | 130 | 0.15 | 20 | Aluminum tripoly-phosphate | 30 | 0 | Example |
| 31 | Styrene acrylic | 120 | 240 | 2.00 | 10000 | 40 | Polyeth-ylene | 130 | 0.15 | 20 | Aluminum tripoly-phosphate | 40 | 0 | Example |
| 32 | Styrene acrylic | 120 | 240 | 2.00 | 10000 | 65 | Polyeth-ylene | 130 | 0.15 | 20 | Zinc phosphate | 15 | 0 | Example |
| 33 | Styrene acrylic | 120 | 240 | 2.00 | 10000 | 65 | Polyeth-ylene | 130 | 0.15 | 20 | Zinc oxide | 15 | 0 | Example |

TABLE 2-continued

| | Acrylic resin | | | | | Wax | | | | Antirust agent | | Silica | | |
|---|---|---|---|---|---|---|---|---|---|---|---|---|---|---|
| No. | Type | Tg (° C.) | Acid value (mg-KOH/g) | R (=acid value/Tg) | Molec-ular weight | Mass frac-tion (%) | Type | Melting point (° C.) | Average particle diameter (μm) | Mass frac-tion (%) | Type | Mass frac-tion (%) | Mass frac-tion (%) | Remarks |
| 34 | Styrene acrylic | 120 | 240 | 2.00 | 10000 | 64 | Polyeth-ylene | 130 | 0.15 | 20 | Aluminum tripoly-phosphate | 15 | 1 | Example |
| 35 | Styrene acrylic | 120 | 240 | 2.00 | 10000 | 60 | Polyeth-ylene | 130 | 0.15 | 20 | Aluminum tripoly-phosphate | 15 | 5 | Example |
| 36 | Styrene acrylic | 120 | 240 | 2.00 | 10000 | 55 | Polyeth-ylene | 130 | 0.15 | 20 | Aluminum tripoly-phosphate | 15 | 10 | Example |
| 37 | Styrene acrylic | 120 | 240 | 2.00 | 10000 | 50 | Polyeth-ylene | 130 | 0.15 | 20 | Aluminum tripoly-phosphate | 15 | 15 | Example |

(1) Press Formability (Sliding Property) Evaluation Method

To evaluate the press formability, the friction coefficients of the test materials were measured as follows.

FIG. 1 is a schematic front view of a friction coefficient meter. As illustrated in this drawing, a friction coefficient measurement sample 1 taken from a test material was fixed onto a sample stage 2, and the sample stage 2 was fixed to an upper surface of a horizontally movable slide table 3. A slide table support stage 5 capable of moving upward and downward and having rollers 4 in contact with a lower surface of the slide table 3 was disposed under the slide table 3, and a first load cell 7 for measuring a pressing load N applied to the friction coefficient measurement sample 1 from a bead 6 as the slide table support table 5 was pushed upward was installed onto the slide table support stage 5. A second load cell 8 for measuring a sliding resistance force F for moving the slide table 3 in a horizontal direction while the pressing force was acting was installed onto an end portion of the slide table 3. A cleaning oil for pressing, PRETON (registered trademark) R352L, produced by SUG-IMURA Chemical Industrial Co., Ltd., serving as a lubricant oil was applied to a surface of the sample 1, and then the test was conducted.

Figure 2:
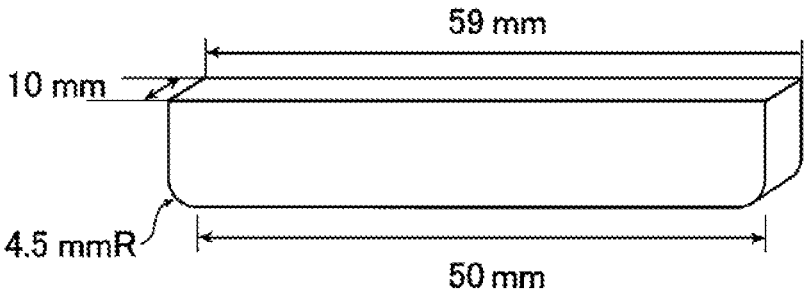
FIG. 2 is a schematic perspective view illustrating the shape and dimensions of a bead illustrated in FIG. 1.

FIG. 2 is a schematic perspective view illustrating the shape and dimensions of the bead used. Sliding occurs as the lower surface of the bead 6 is pressed against the surface of the sample 1. The shape of the bead 6 illustrated in FIG. 2 has a width of 10 mm and a length of 59 mm in the sample sliding direction, and lower portions at two ends in the sliding direction are each constituted by a curved surface having a curvature of 4.5 mmR. The bead lower surface against which the sample is pressed has a flat surface having a width of 10 mm and a length of 50 mm in the sliding direction.

The friction coefficient measurement test was carried out by using the bead illustrated in FIG. 2 at a pressing load N: 400 kgf and a sample withdrawing rate (speed of the slide table 3 moving in the horizontal direction): 20 cm/min. The friction coefficient μ between the test material and the bead was calculated from the formula μ=F/N.

The sliding property was evaluated as follows: a friction coefficient of 0.119 or less was considered particularly excellent slidability and evaluated as ⊚; a friction coefficient of more than 0.119 and 0.130 or less was considered excellent slidability and evaluated as ○; and a friction coefficient exceeding 0.130 was considered insufficient and evaluated as x.

(2) Weldability Evaluation Method

Each of the test specimens was subjected to a continuous spot welding test under the following conditions: electrode used: DR-type Cr—Cu electrode, pressing force: 150 kgf, current feeding time: 10 cycles/60 Hz, welding current: 7.5 kA, and evaluated on the basis of the number of continuous spots. The case where the number of continuous spots was 5000 or more was considered excellent weldability and evaluated as ○, and the case where the number of continuous spots was less than 5000 was considered insufficient weld-ability and evaluated as x.

(3) Film Removability Evaluation Method

On the assumption that the steel sheet according to aspects of the present invention is used in automobile applications, the film removability during degreasing was evaluated. In order to determine the removability of the film, each of the test specimens was degreased with an alkaline degreaser, Fine Cleaner (registered trademark) E6403 (pro-duced by Nihon Parkerizing Co., Ltd.). The degreasing involved immersing the test specimen in a degreasing liquid having a degreaser concentration of 20 g/L at a temperature of 40° C. for a particular length of time and then washing the test specimen with tap water. The surface carbon intensity of the degreased test specimen was measured with an X-ray fluorescence analyzer, and the film removing rate was cal-culated from the equation below by using the measured value, the preliminarily measured surface carbon intensity before degreasing, and the surface carbon intensity of an untreated metal sheet.

Film removing rate (%) = [(carbon intensity before degreasing − carbon intensity after degreasing)/(carbon intensity before degreasing − carbon intensity of untreated steel sheet)] × 100

The film removability was evaluated according to the following standard on the basis of the time of immersion in an alkaline degreasing liquid for which the film removing rate was 98% or more. The case where the time was 120 second or shorter was considered excellent film removability and evaluated as ○, and the case where the time was longer than 120 seconds was considered insufficient film remov-ability and evaluated as Δ.

(4) Antirust Property Evaluation Method

On the assumption that the steel sheet according to aspects of the present invention is to be stored as a coiled steel strip, the antirust property in a lapped state was evaluated. Each of the test specimens was processed into 150 mm×70 mm size, an antirust oil was applied to both surfaces in an amount of 1.0 g/m² per surface, two test specimens were placed on top of each other, and the test was carried out at a temperature of 50° C. and a humidity of 95% RH while a load was applied so that the contact pressure was 0.02 kgf/mm². The antirust property was evaluated every seven days by checking the inner surfaces that were placed on top of each other and counting the days taken for the rust to occur. The case where the number of days was 56 days or more was considered a particularly excellent antirust property and evaluated as ⊚, the case where the number of days was 21 or more was considered an excellent antirust property and evaluated as ○, and the case where the number of days was less than 21 was considered an insufficient antirust property and evaluated as Δ.

(5) Adhesion Evaluation Method

Each of the test specimens was processed into 100×25.4 mm size, immersed in an antirust oil, and then allowed to stand perpendicularly for 24 hours to remove excess oil. By using two such test specimens, an epoxy adhesive was evenly applied to a thickness of 0.2 mm in a 25.4 mm×13 mm portion, and the two test specimens were placed on top of each other, held together with a clip, and baked at 180° C. for 20 minutes to dry and cure. After cooling, a shear tensile test was performed with an autograph tester to measure the shear adhesive strength. The case where the adhesive strength was 20 MPa or more was considered excellent adhesion and evaluated as ○, and the case where the adhesive strength was less than 20 MPa was considered insufficient adhesion and evaluated as Δ.

TABLE 3-1

| No | Steel sheet | Coating solution No | Film coating weight (g/m²) | Friction coef-ficient | Slidability Eval-uation | Weldability Eval-uation | Film removal time (sec) | Film removability Eval-uation | Days until rusting | Antirust property Eval-uation | Adhesion Strength (MPa) | Eval-uation | Remarks |
|----|----|----|----|----|----|----|----|----|----|----|----|----|----|
| 1 | B | 1 | 1.0 | 0.135 | × | ○ | 90 | ○ | 21 | ○ | 6.0 | Δ | Comparative Example |
| 2 | B | 2 | 1.0 | 0.109 | ⊚ | ○ | 30 | ○ | 28 | ○ | 21.4 | ○ | Example |
| 3 | B | 3 | 1.0 | 0.099 | ⊚ | ○ | 30 | ○ | 28 | ○ | 28.5 | ○ | Example |
| 4 | B | 3 | 0.2 | 0.134 | x | ○ | 10 | ○ | 35 | ○ | 29.1 | ○ | Comparative Example |
| 5 | B | 3 | 0.3 | 0.127 | ○ | ○ | 10 | ○ | 35 | ○ | 29.0 | ○ | Example |
| 6 | B | 3 | 2.0 | 0.095 | ⊚ | ○ | 60 | ○ | 28 | ○ | 22.5 | ○ | Example |
| 7 | B | 3 | 2.5 | 0.097 | ⊚ | ○ | 120 | ○ | 28 | ○ | 20.6 | ○ | Example |
| 8 | B | 3 | 3.0 | 0.099 | ⊚ | x | 150 | Δ | 28 | ○ | 17.5 | Δ | Comparative Example |
| 9 | B | 4 | 1.0 | 0.094 | ⊚ | ○ | 10 | ○ | 21 | ○ | 29.0 | ○ | Example |
| 10 | B | 5 | 1.0 | 0.093 | ⊚ | ○ | 10 | ○ | 7 | Δ | 28.4 | ○ | Example |
| 11 | B | 6 | 1.0 | 0.124 | ○ | ○ | 180 | Δ | 28 | ○ | 16.9 | Δ | Example |
| 12 | B | 7 | 1.0 | 0.124 | ○ | ○ | 120 | ○ | 28 | ○ | 28.5 | ○ | Example |
| 13 | B | 8 | 1.0 | 0.121 | ○ | ○ | 30 | ○ | 14 | Δ | 28.5 | ○ | Example |
| 14 | B | 9 | 1.0 | 0.100 | ⊚ | ○ | 30 | ○ | 28 | ○ | 29.0 | ○ | Example |
| 15 | B | 10 | 1.0 | 0.110 | ⊚ | ○ | 30 | ○ | 28 | ○ | 20.5 | ○ | Example |
| 16 | B | 11 | 1.0 | 0.111 | ⊚ | ○ | 30 | ○ | 28 | ○ | 17.3 | Δ | Example |
| 17 | B | 12 | 1.0 | 0.132 | x | ○ | 120 | ○ | 28 | ○ | 27.5 | ○ | Comparative Example |
| 18 | B | 13 | 1.0 | 0.137 | x | ○ | 180 | Δ | 28 | ○ | 22.3 | ○ | Comparative Example |
| 19 | B | 14 | 1.0 | 0.145 | x | ○ | 30 | ○ | 28 | ○ | 27.0 | ○ | Comparative Example |
| 20 | B | 15 | 1.0 | 0.125 | ○ | ○ | 30 | ○ | 28 | ○ | 27.0 | ○ | Example |
| 21 | B | 16 | 1.0 | 0.114 | ⊚ | ○ | 30 | ○ | 28 | ○ | 28.5 | ○ | Example |
| 22 | B | 17 | 1.0 | 0.128 | ○ | ○ | 30 | ○ | 28 | ○ | 28.9 | ○ | Example |
| 23 | B | 18 | 1.0 | 0.167 | x | ○ | 30 | ○ | 28 | ○ | 29.0 | ○ | Comparative Example |
| 24 | B | 19 | 1.0 | 0.113 | ⊚ | ○ | 30 | ○ | 28 | ○ | 27.5 | ○ | Example |
| 25 | B | 20 | 1.0 | 0.127 | ○ | ○ | 30 | ○ | 28 | ○ | 22.9 | ○ | Example |
| 26 | B | 21 | 1.0 | 0.145 | x | ○ | 30 | ○ | 28 | ○ | 21.4 | ○ | Comparative Example |
| 27 | B | 22 | 1.0 | 0.210 | x | ○ | 30 | ○ | 28 | ○ | 29.2 | ○ | Comparative Example |
| 28 | B | 23 | 1.0 | 0.127 | ○ | ○ | 30 | ○ | 28 | ○ | 28.8 | ○ | Example |
| 29 | B | 24 | 1.0 | 0.117 | ⊚ | ○ | 30 | ○ | 28 | ○ | 28.6 | ○ | Example |
| 30 | B | 25 | 1.0 | 0.099 | ⊚ | ○ | 120 | ○ | 28 | ○ | 22.6 | ○ | Example |
| 31 | B | 26 | 1.0 | 0.101 | ⊚ | ○ | 180 | Δ | 28 | ○ | 12.4 | Δ | Example |

TABLE 3-1-continued

| No | Steel sheet | Coating solution No | Film coating weight (g/m²) | Slidability Friction coef-ficient | Slidability Eval-uation | Weldability Eval-uation | Film removability Film removal time (sec) | Film removability Eval-uation | Antirust property Days until rusting | Antirust property Eval-uation | Adhesion Strength (MPa) | Adhesion Eval-uation | Remarks |
|---|---|---|---|---|---|---|---|---|---|---|---|---|---|
| 32 | B | 27 | 1.0 | 0.125 | o | o | 30 | o | 7 | Δ | 29.0 | o | Example |
| 33 | B | 28 | 1.0 | 0.110 | ◎ | o | 30 | o | 35 | o | 28.4 | o | Example |

TABLE 3-2

| No. | Steel sheet | Coating solution No | Film coating weight (g/m²) | Slidability Friction coef-ficient | Slidability Eval-uation | Weldability Eval-uation | Film removability Film removal time (sec) | Film removability Eval-uation | Antirust property Days until rusting | Antirust property Eval-uation | Adhesion Strength (MPa) | Adhesion Eval-uation | Remarks |
|---|---|---|---|---|---|---|---|---|---|---|---|---|---|
| 34 | B | 29 | 1.0 | 0.112 | ◎ | o | 30 | o | 56 or more | ◎ | 28.4 | o | Example |
| 35 | B | 30 | 1.0 | 0.111 | ◎ | o | 30 | o | 56 or more | ◎ | 24.1 | o | Example |
| 36 | B | 31 | 1.0 | 0.114 | o | o | 30 | o | 56 or more | ◎ | 15.9 | Δ | Example |
| 37 | B | 32 | 1.0 | 0.105 | ◎ | o | 30 | o | 56 or more | ◎ | 28.7 | o | Example |
| 38 | B | 33 | 1.0 | 0.101 | ◎ | o | 30 | o | 56 or more | ◎ | 28.5 | o | Example |
| 39 | B | 34 | 1.0 | 0.102 | ◎ | o | 30 | o | 56 or more | ◎ | 28.5 | o | Example |
| 40 | B | 35 | 1.0 | 0.104 | ◎ | o | 30 | o | 56 or more | ◎ | 25.5 | o | Example |
| 41 | B | 36 | 1.0 | 0.103 | ◎ | o | 60 | o | 56 or more | ◎ | 22.7 | o | Example |
| 42 | B | 37 | 1.0 | 0.107 | ◎ | o | 90 | o | 56 or more | ◎ | 12.5 | Δ | Example |
| 43 | B | No film | 0.0 | 0.175 | x | o | 0 | o | 56 or more | ◎ | 29.0 | o | Comparative Example |
| 44 | C | 1 | 1.0 | 0.140 | x | o | 90 | o | 28 | o | 7.5 | Δ | Comparative Example |
| 45 | C | 2 | 1.0 | 0.115 | ◎ | o | 30 | o | 28 | o | 22.6 | o | Example |
| 46 | C | 3 | 1.0 | 0.109 | ◎ | o | 30 | o | 28 | o | 30.1 | o | Example |
| 47 | C | 3 | 0.2 | 0.137 | x | o | 10 | o | 35 | o | 29.9 | o | Comparative Example |
| 48 | C | 3 | 0.3 | 0.129 | o | o | 10 | o | 35 | o | 30.2 | o | Example |
| 49 | C | 3 | 2.0 | 0.103 | ◎ | o | 60 | o | 28 | o | 24.5 | o | Example |
| 50 | C | 3 | 2.5 | 0.099 | ◎ | o | 120 | o | 28 | o | 21.5 | o | Example |
| 51 | C | 3 | 3.0 | 0.101 | ◎ | x | 150 | Δ | 28 | o | 18.3 | Δ | Comparative Example |
| 52 | C | 4 | 1.0 | 0.106 | ◎ | o | 10 | o | 21 | o | 30.8 | o | Example |
| 53 | C | 5 | 1.0 | 0.105 | ◎ | o | 10 | o | 7 | Δ | 29.7 | o | Example |
| 54 | C | 6 | 1.0 | 0.124 | o | o | 180 | Δ | 28 | o | 18.5 | Δ | Example |
| 55 | C | 7 | 1.0 | 0.126 | o | o | 120 | o | 28 | o | 29.4 | o | Example |
| 56 | C | 8 | 1.0 | 0.124 | o | o | 30 | o | 14 | Δ | 30.3 | o | Example |
| 57 | C | 9 | 1.0 | 0.107 | ◎ | o | 30 | o | 28 | o | 30.5 | o | Example |
| 58 | C | 10 | 1.0 | 0.114 | ◎ | o | 30 | o | 28 | o | 21.6 | o | Example |
| 59 | C | 11 | 1.0 | 0.118 | ◎ | o | 30 | o | 28 | o | 18.7 | Δ | Example |
| 60 | C | 12 | 1.0 | 0.135 | x | o | 120 | o | 28 | o | 28.9 | o | Comparative Example |
| 61 | C | 13 | 1.0 | 0.140 | x | o | 180 | Δ | 28 | o | 24.1 | o | Comparative Example |
| 62 | C | 14 | 1.0 | 0.150 | x | o | 30 | o | 28 | o | 28.6 | o | Comparative Example |
| 63 | C | 15 | 1.0 | 0.127 | o | o | 30 | o | 28 | o | 28.7 | o | Example |
| 64 | C | 16 | 1.0 | 0.117 | ◎ | o | 30 | o | 28 | o | 29.7 | o | Example |

TABLE 3-2-continued

| No. | Steel sheet | Coating solution No | Film coating weight (g/m$^2$) | Slidability Friction coef-ficient | Slidability Eval-uation | Weldability Eval-uation | Film removability Film removal time (sec) | Film removability Eval-uation | Antirust property Days until rusting | Antirust property Eval-uation | Adhesion Strength (MPa) | Adhesion Eval-uation | Remarks |
|---|---|---|---|---|---|---|---|---|---|---|---|---|---|
| 65 | C | 17 | 1.0 | 0.129 | ○ | ○ | 30 | ○ | 28 | ○ | 30.1 | ○ | Example |
| 66 | C | 18 | 1.0 | 0.168 | x | ○ | 30 | ○ | 28 | ○ | 30.0 | ○ | Comparative Example |

TABLE 3-3

| No. | Steel sheet | Coating solution No. | Film coating weight (g/m$^2$) | Slidability Friction coef-ficient | Slidability Eval-uation | Weldability Eval-uation | Film removability Film removal time (sec) | Film removability Eval-uation | Antirust property Days until rusting | Antirust property Eval-uation | Adhesion Strength (MPa) | Adhesion Eval-uation | Remarks |
|---|---|---|---|---|---|---|---|---|---|---|---|---|---|
| 67 | C | 19 | 1.0 | 0.115 | ◎ | ○ | 30 | ○ | 28 | ○ | 28.5 | ○ | Example |
| 68 | C | 20 | 1.0 | 0.127 | ○ | ○ | 30 | ○ | 28 | ○ | 24.6 | ○ | Example |
| 69 | C | 21 | 1.0 | 0.150 | x | ○ | 30 | ○ | 28 | ○ | 22.8 | ○ | Comparative Example |
| 70 | C | 22 | 1.0 | 0.194 | x | ○ | 30 | ○ | 28 | ○ | 30.9 | ○ | Comparative Example |
| 71 | C | 23 | 1.0 | 0.128 | ○ | ○ | 30 | ○ | 28 | ○ | 29.7 | ○ | Example |
| 72 | C | 24 | 1.0 | 0.115 | ◎ | ○ | 30 | ○ | 28 | ○ | 30.4 | ○ | Example |
| 73 | C | 25 | 1.0 | 0.107 | ◎ | ○ | 120 | ○ | 28 | ○ | 23.9 | ○ | Example |
| 74 | C | 26 | 1.0 | 0.109 | ◎ | ○ | 180 | Δ | 28 | ○ | 13.9 | Δ | Example |
| 75 | C | 27 | 1.0 | 0.127 | ○ | ○ | 30 | ○ | 7 | Δ | 30.4 | ○ | Example |
| 76 | C | 28 | 1.0 | 0.111 | ◎ | ○ | 30 | ○ | 35 | ○ | 30.1 | ○ | Example |
| 77 | C | 29 | 1.0 | 0.113 | ◎ | ○ | 30 | ○ | 56 or more | ○ | 30.0 | ○ | Example |
| 78 | C | 30 | 1.0 | 0.115 | ◎ | ○ | 30 | ○ | 56 or more | ○ | 26.9 | ○ | Example |
| 79 | C | 31 | 1.0 | 0.117 | ○ | ○ | 30 | ○ | 56 or more | ○ | 17.4 | Δ | Example |
| 80 | C | 32 | 1.0 | 0.110 | ◎ | ○ | 30 | ○ | 56 or more | ○ | 30.1 | ○ | Example |
| 81 | C | 33 | 1.0 | 0.109 | ◎ | ○ | 30 | ○ | 56 or more | ○ | 30.0 | ○ | Example |
| 82 | C | 34 | 1.0 | 0.105 | ◎ | ○ | 30 | ○ | 56 or more | ○ | 30.5 | ○ | Example |
| 83 | C | 35 | 1.0 | 0.109 | ◎ | ○ | 30 | ○ | 56 or more | ○ | 27.4 | ○ | Example |
| 84 | C | 36 | 1.0 | 0.107 | ◎ | ○ | 60 | ○ | 56 or more | ○ | 23.6 | ○ | Example |
| 85 | C | 37 | 1.0 | 0.108 | ◎ | ○ | 90 | ○ | 56 or more | ○ | 13.8 | Δ | Example |
| 86 | C | No film | 0.0 | 0.173 | x | ○ | 0 | ○ | 56 or more | ◎ | 30.7 | ○ | Comparative Example |
| 87 | A | 3 | 1.0 | 0.094 | ◎ | ○ | 30 | ○ | 28 | ○ | 27.6 | ○ | Example |
| 88 | A | 3 | 0.2 | 0.131 | x | ○ | 10 | ○ | 35 | ○ | 27.8 | ○ | Comparative Example |
| 89 | A | 3 | 0.3 | 0.124 | ○ | ○ | 10 | ○ | 35 | ○ | 27.9 | ○ | Example |
| 90 | A | 3 | 2.0 | 0.092 | ◎ | ○ | 60 | ○ | 28 | ○ | 21.9 | ○ | Example |
| 91 | A | 3 | 2.5 | 0.091 | ◎ | ○ | 120 | ○ | 28 | ○ | 20.1 | ○ | Example |
| 92 | A | 3 | 3.0 | 0.092 | ◎ | x | 150 | Δ | 28 | ○ | 15.3 | Δ | Comparative Example |
| 93 | A | No film | 0.0 | 0.173 | x | ○ | 0 | ○ | 56 or more | ◎ | 27.9 | ○ | Comparative Example |
| 94 | D | 3 | 1.0 | 0.107 | ◎ | ○ | 30 | ○ | 28 | ○ | 31.2 | ○ | Example |
| 95 | D | 3 | 0.2 | 0.164 | x | ○ | 10 | ○ | 35 | ○ | 31.5 | ○ | Comparative Example |
| 96 | D | 3 | 0.3 | 0.129 | ○ | ○ | 10 | ○ | 35 | ○ | 31.7 | ○ | Example |
| 97 | D | 3 | 2.0 | 0.103 | ◎ | ○ | 60 | ○ | 28 | ○ | 25.5 | ○ | Example |

TABLE 3-3-continued

| | | Film | Slidability | | | Weldability | Film removability | | Antirust property | | | | |
| | | | coating | Friction | | | Film | | Days | | Adhesion | | |
| | | Coating | weight | coef- | Eval- | Eval- | removal | Eval- | until | Eval- | Strength | Eval- | |
| No. | Steel sheet | solution No. | (g/m²) | ficient | uation | uation | time (sec) | uation | rusting | uation | (MPa) | uation | Remarks |
|---|---|---|---|---|---|---|---|---|---|---|---|---|---|
| 98 | D | 3 | 2.5 | 0.108 | ◎ | ○ | 120 | ○ | 28 | ○ | 21.7 | ○ | Example |
| 99 | D | 3 | 3.0 | 0.105 | ◎ | x | 150 | Δ | 28 | ○ | 19.0 | Δ | Comparative Example |
| 100 | D | No film | 0.0 | 0.179 | x | ○ | 0 | ○ | 56 or more | ◎ | 31.6 | ○ | Comparative Example |

According to Tables 3-1 to 3-3, all of the steel sheets according to aspects of the present invention exhibited excellent press formability. In contrast, the steel sheets of Comparative Examples that lacked the technical features of the present invention exhibited inferior press formability.

INDUSTRIAL APPLICABILITY

A steel sheet according to aspects of the present invention has excellent slidability during press forming, weldability, film removability by alkali, antirust property, and adhesion. Due to these excellent properties, the steel sheet is applicable in a wide range of fields centering on automobile body usages.

REFERENCE SIGNS LIST

1 friction coefficient measurement sample
2 sample stage
3 slide table
4 roller
5 slide table support stage
6 bead
7 first load cell
8 second load cell
9 rail

The invention claimed is:

1. A steel sheet having at least one surface on which a film containing an acrylic resin and a wax is formed, wherein the acrylic resin has a glass transition point (Tg) of 100° C. or higher and an acid value-to-glass transition point ratio R=acid value (mg-KOH/g)/Tg (° C.) of 1.50 or more, the wax is a polyolefin wax that has a melting point of 100° C. or higher and 145° C. or lower and an average particle diameter of 3.0 µm or less, a proportion of the wax in the film is 10 mass % or more, and a coating weight W of the film per surface is 0.3 g/m² or more and 2.5 g/m² or less.

2. The steel sheet according to claim 1, wherein the acid value of the acrylic resin is 180 mg-KOH/g or more and 350 mg-KOH/g or less.

3. The steel sheet according to claim 1, wherein the acid value-to-glass transition point ratio R of the acrylic resin is 1.50 or more and 2.05 or less.

4. The steel sheet according to claim 1, wherein the film contains 30 mass % or more of the acrylic resin, and the proportion of the wax is 10 mass % or more and 50 mass % or less.

5. The steel sheet according to claim 1, wherein the acrylic resin has a mass-average molecular weight of 5000 or more and 30000 or less.

6. The steel sheet according to claim 1, wherein the acrylic resin is a styrene acrylic resin.

7. The steel sheet according to claim 1, wherein the steel sheet before formation of the film has an arithmetic mean roughness Ra of 0.4 µm or more and 2.5 µm or less.

8. The steel sheet according to claim 1, wherein the film contains 5 mass % or more and 30 mass % or less of an antirust agent.

9. The steel sheet according to claim 1, wherein the wax has an average particle diameter of 0.01 µm or more and 0.5 µm or less.

10. The steel sheet according to claim 1, wherein the film contains 1 mass % or more and 10 mass % or less of silica.

11. The steel sheet according to claim 1, wherein a friction coefficient between the steel sheet and a bead pressed against the steel sheet at a pressing load of 400 kgf and a withdrawing rate of 20 cm/min is 0.130 or less.

\* \* \* \* \*